(12) United States Patent
Bulteel

(10) Patent No.: US 10,015,429 B2
(45) Date of Patent: Jul. 3, 2018

(54) METHOD AND SYSTEM FOR REDUCING NOISE IN AN IMAGE SENSOR USING A PARALLEL MULTI-RAMPS MERGED COMPARATOR ANALOG-TO-DIGITAL CONVERTER

(71) Applicant: OMNIVISION TECHNOLOGIES, INC., Santa Clara, CA (US)

(72) Inventor: Olivier Bulteel, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 14 days.

(21) Appl. No.: 14/992,953

(22) Filed: Jan. 11, 2016

(65) Prior Publication Data

US 2017/0195607 A1 Jul. 6, 2017

Related U.S. Application Data

(63) Continuation-in-part of application No. 14/985,092, filed on Dec. 30, 2015, now abandoned.

(51) Int. Cl.
*H04N 5/378* (2011.01)

(52) U.S. Cl.
CPC .................. *H04N 5/378* (2013.01)

(58) Field of Classification Search
CPC ................... H04N 5/37455; H04N 5/363
See application file for complete search history.

(56) References Cited

U.S. PATENT DOCUMENTS

| 6,188,347 | B1 * | 2/2001 | Knudsen | G06F 7/607 341/159 |
| 7,336,110 | B1 * | 2/2008 | Payrard | H03K 4/06 327/131 |
| 7,705,897 | B2 * | 4/2010 | Muramatsu | H04N 5/335 348/294 |
| 7,768,432 | B2 * | 8/2010 | Tu | H03M 1/1215 341/118 |
| 7,889,790 | B2 | 2/2011 | Sun | |

(Continued)

OTHER PUBLICATIONS

Oike, Y. et al., "Session 6 Overview: Image Sensors and Displays: IMMD Subcommittee", 2015 IEEE International Solid-State Circuits Conference, Feb. 22-26, 2015, San Francisco, Digest of Technical Papers, 2015 IEEE, 26 pages.

(Continued)

*Primary Examiner* — Cynthia Segura
(74) *Attorney, Agent, or Firm* — Christensen O'Connor Johnson Kindness PLLC

(57) ABSTRACT

A method of reducing noise in an image sensor using a parallel multi-ramps merged comparator analog-to-digital converter (ADC) starts with a pixel array capturing image data. The pixel array includes pixels to generate pixel data signals, respectively. An ADC circuitry acquires the pixel data signals. The ADC circuitry includes ADC circuits. Each of the ADC circuits includes a comparator and latches. The comparator includes a multi-input first stage. The comparator in each ADC circuit compares one of the pixel data signals to ramp signals received from a logic circuitry to generate comparator output signals. The latches in each ADC circuit latches the counter based on the comparator output signals, respectively, to generate ADC outputs. Other embodiments are described.

22 Claims, 5 Drawing Sheets

(56) References Cited

U.S. PATENT DOCUMENTS

| | | | | |
|---|---|---|---|---|
| 8,310,580 B2* | 11/2012 | Suzuki | H04N 5/3575 | 348/308 |
| 8,358,349 B2* | 1/2013 | Nishi | H03M 1/0678 | 341/155 |
| 8,421,664 B2* | 4/2013 | Ryu | H03M 1/002 | 341/155 |
| 8,687,097 B2* | 4/2014 | Oike | H03M 1/1023 | 348/294 |
| 9,391,632 B1* | 7/2016 | Mikkelsen | H04N 5/378 | |
| 9,819,891 B2* | 11/2017 | Lee | H04N 5/378 | |
| 2004/0041611 A1* | 3/2004 | Bult | H03K 3/012 | 327/219 |
| 2004/0239546 A1* | 12/2004 | Watanabe | G04F 10/005 | 341/157 |
| 2005/0253942 A1* | 11/2005 | Muramatsu | H04N 9/083 | 348/273 |
| 2008/0211951 A1* | 9/2008 | Wakabayashi | H04N 5/3655 | 348/308 |
| 2009/0225211 A1* | 9/2009 | Oike | H03M 1/1023 | 348/308 |
| 2010/0165164 A1* | 7/2010 | Muramatsu | H04N 5/335 | 348/302 |
| 2010/0259660 A1* | 10/2010 | Kukita | H04N 5/23241 | 348/308 |
| 2010/0265374 A1* | 10/2010 | Nishi | H03M 1/0678 | 348/302 |
| 2011/0025900 A1* | 2/2011 | Kondo | H04N 5/378 | 348/308 |
| 2011/0080507 A1* | 4/2011 | Iwasa | H04N 5/378 | 348/302 |
| 2011/0234867 A1* | 9/2011 | Sato | H04N 5/3575 | 348/294 |
| 2011/0304757 A1* | 12/2011 | Egawa | H04N 5/355 | 348/300 |
| 2012/0008028 A1* | 1/2012 | Egawa | H04N 5/378 | 348/300 |
| 2012/0086842 A1* | 4/2012 | Oike | H03M 1/1023 | 348/308 |
| 2012/0249851 A1* | 10/2012 | Martinussen | H04N 5/378 | 348/308 |
| 2013/0089175 A1* | 4/2013 | Mo | H04N 5/355 | 377/49 |
| 2013/0222662 A1* | 8/2013 | Sakurai | H04N 5/378 | 348/308 |
| 2014/0078360 A1* | 3/2014 | Park | H04N 5/355 | 348/294 |
| 2014/0166857 A1* | 6/2014 | Ookuma | H04N 5/378 | 250/208.1 |
| 2014/0203956 A1* | 7/2014 | Meynants | H03M 1/34 | 341/164 |
| 2014/0209784 A1* | 7/2014 | Morita | H04N 5/378 | 250/208.1 |
| 2014/0225760 A1* | 8/2014 | Yang | H04N 5/335 | 341/155 |
| 2014/0368371 A1* | 12/2014 | Yoo | H03F 3/211 | 341/156 |
| 2015/0049231 A1* | 2/2015 | Chen | H04N 5/3742 | 348/308 |
| 2015/0138413 A1* | 5/2015 | Sato | H04N 5/378 | 348/302 |
| 2015/0162929 A1* | 6/2015 | Shinozuka | H04N 5/378 | 348/294 |
| 2015/0237281 A1* | 8/2015 | Deguchi | H04N 5/243 | 348/301 |
| 2015/0326242 A1* | 11/2015 | Shin | H03M 1/56 | 250/208.1 |
| 2015/0326811 A1* | 11/2015 | Nishida | H04N 5/378 | 348/308 |
| 2016/0119522 A1* | 4/2016 | Choi | G06F 3/042 | 348/302 |
| 2016/0150173 A1* | 5/2016 | Johansson | H04N 5/378 | 348/308 |
| 2016/0269005 A1* | 9/2016 | Yoo | H03K 5/24 | |
| 2016/0309109 A1* | 10/2016 | Song | H04N 5/3765 | |
| 2016/0352350 A1* | 12/2016 | Tanizawa | H03M 1/1205 | |
| 2016/0366358 A1* | 12/2016 | Shin | H04N 5/378 | |
| 2017/0085820 A1* | 3/2017 | Inada | H03M 1/08 | |

OTHER PUBLICATIONS

Taiwanese Office Action with Search Report and Translation dated Mar. 19, 2018 for Taiwanese Application No. 105134235, filed Oct. 24, 2016, 12 pages.

* cited by examiner

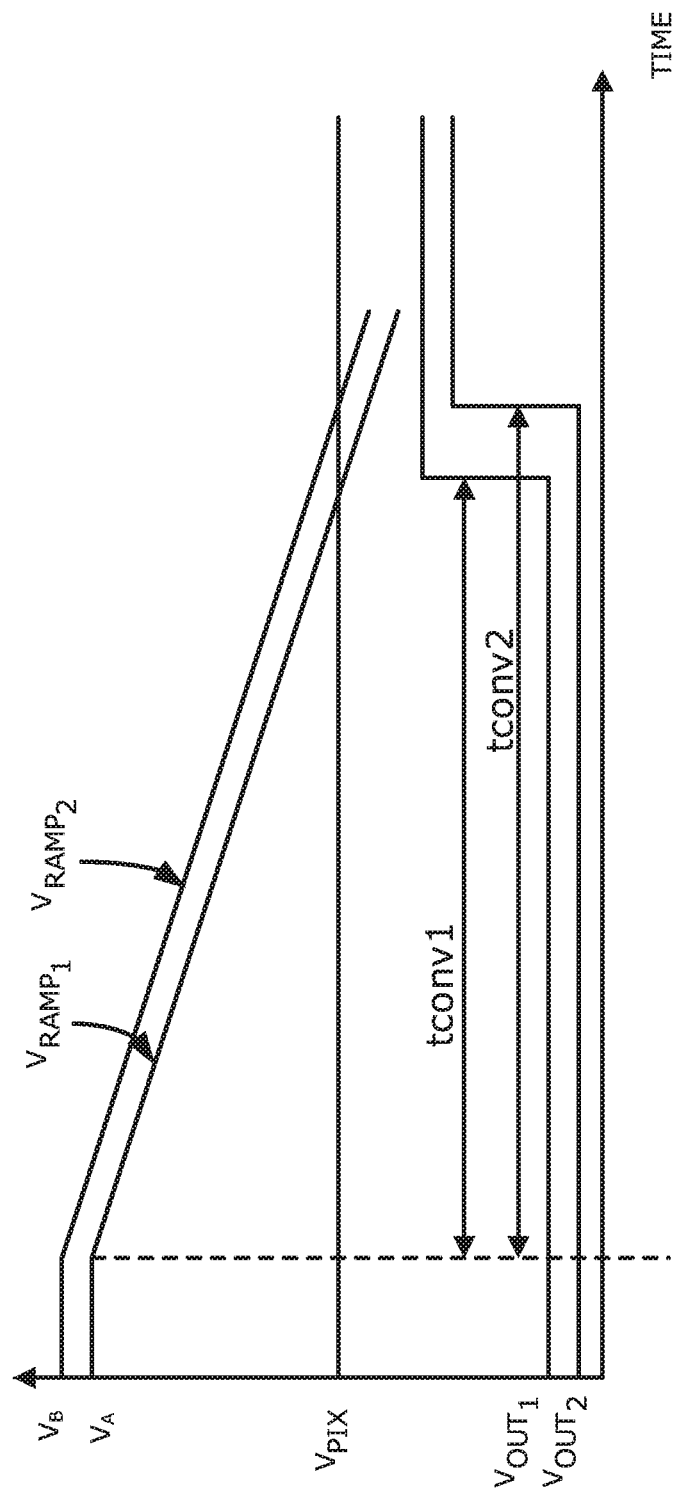

METHOD AND SYSTEM FOR REDUCING NOISE IN AN IMAGE SENSOR USING A PARALLEL MULTI-RAMPS MERGED COMPARATOR ANALOG-TO-DIGITAL CONVERTER

CROSS-REFERENCED APPLICATIONS

This application is a continuation-in-part application of U.S. patent application Ser. No. 14/985,092, filed on Dec. 30, 2015, the entire contents of which are incorporated herein by reference.

FIELD

An example of the present invention relates generally to image sensors. More specifically, examples of the present invention are related to methods and systems for reducing noise in an image sensor using a parallel multi-ramps merged comparator analog-to-digital converter (ADC).

BACKGROUND

High speed image sensors have been widely used in many applications in different fields including the automotive field, the machine vision field, and the field of professional video photography. The technology used to manufacture image sensors, and in particular, complementary-metal-oxide-semiconductor (CMOS) image sensors, has continued to advance at great pace. For example, the demand of higher frame rates and lower power consumption has encouraged the further miniaturization and integration of these image sensors.

In addition to the frame rate and power consumption demands, image sensors are also subjected to performance demands. The quality and accuracy of the pixel readouts cannot be compromised to accommodate the increase in frame rate or power consumption.

In order to reduce the noise on the image output, current image sensors are multisampling in ramp ADC. However, the current image sensors require time, power, and chip area to perform the multisampling in ramp ADC effectively.

BRIEF DESCRIPTION OF THE DRAWINGS

The embodiments of the invention are illustrated by way of example and not by way of limitation in the figures of the accompanying drawings in which like references indicate similar elements throughout the various views unless otherwise specified. It should be noted that references to "an" or "one" embodiment of the invention in this disclosure are not necessarily to the same embodiment, and they mean at least one. In the drawings:

FIG. 4A is a graph illustrating comparator output signals, one of the pixel data signals, and ramp signals (y-axis) in relation to the time (x-axis) in accordance to one embodiment of the invention.

Figure 1:
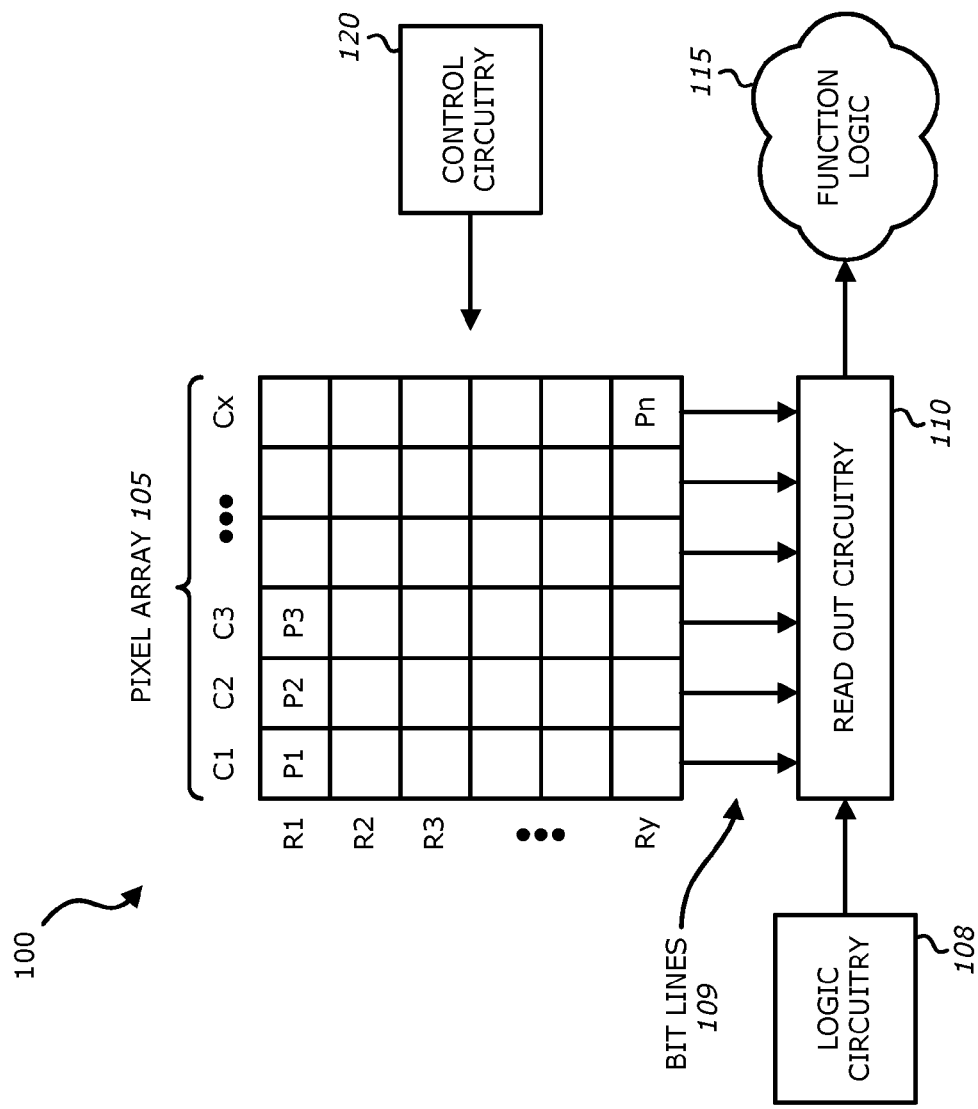
FIG. 1 is a block diagram illustrating an example imaging system for reducing noise using a parallel multi-ramps merged comparator ADC in accordance to one embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. However, it is understood that embodiments of the invention may be practiced without these specific details. In other instances, well-known circuits, structures, and techniques have not been shown to avoid obscuring the understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Particular features, structures or characteristics may be included in an integrated circuit, an electronic circuit, a combinatorial logic circuit, or other suitable components that provide the described functionality.

Examples in accordance with the teaching of the present invention describe an image sensor that reduces noise that affects the image sensor output by using a parallel multi-ramps merged comparator analog-to-digital converter (ADC). ADC circuitry included in the image sensor is a column ADC circuitry that includes a plurality of ADC circuits. Each ADC circuit may process a readout of from a column of pixels. Each ADC circuit includes a single comparator with multi-input first stage. For example, the single comparator may includes two or more inputs to receive a plurality of ramp signals and pixel data signals to be converted from analog-to-digital. The ramp signals received by the single comparator may be different values (e.g., different offsets, such as a voltage offset or time offset) to emulate correlated multi-sampling (CMS) or may be the same value to average the comparator noise.

FIG. 1 is a block diagram illustrating an example imaging system for reducing noise using a parallel multi-ramps merged comparator ADC in accordance to one embodiment of the invention. Imaging system 100 may be a complementary metal-oxide-semiconductor ("CMOS") image sensor. As shown in the depicted example, imaging system 100 includes pixel array 105 coupled to control circuitry 120 and readout circuitry 110, which is coupled to function logic 115 and logic control 108.

The illustrated embodiment of pixel array 105 is a two-dimensional ("2D") array of imaging sensors or pixel cells (e.g., pixel cells P1, P2, . . . , Pn). In one example, each pixel cell is a CMOS imaging pixel. Each pixel cell is arranged into a row (e.g., rows R1 to Ry) and a column (e.g., columns C1 to Cx) to acquire image data of a person, place or object, etc., which can then be used to render an image of the person, place or object, etc. Pixel array 105 may includes visible pixels and optical black pixels (OPB). The visible pixels convert the light incident to the pixel to an electrical signal (e.g., a visible signal) and output the visible signal whereas the OPB output a dark signal.

In one example, after each pixel has acquired its image data or image charge, the image data is read out by readout circuitry 110 through readout column bit lines 109 and then transferred to function logic 115. In various examples, readout circuitry 110 may include amplification circuitry (not illustrated), analog-to-digital conversion (ADC) circuitry 220, or otherwise. Function logic 115 may simply store the image data or even manipulate the image data by applying post image effects (e.g., crop, rotate, remove red eye, adjust brightness, adjust contrast, or otherwise). In one example, readout circuitry 110 may read out a row of image data at a time along readout column lines (illustrated) or may read out the image data using a variety of other techniques (not illustrated), such as a serial read out or a full parallel read out of all pixels simultaneously. In one example, an entire column of pixel array 105 may share one readout circuit. In other examples, a group of pixels from pixel array 105, such a plurality of pixels arranged in the same column, or a plurality of pixels arranged in a group or cluster spanning more than one row or column of pixel array 105 may share one readout circuit.

In one example, control circuitry 120 is coupled to pixel array 105 to control operational characteristics of pixel array 105. For example, control circuitry 120 may generate a shutter signal for controlling image acquisition. In one example, the shutter signal is a global shutter signal for simultaneously enabling all pixels within pixel array 105 to simultaneously capture their respective image data during a single acquisition window. In another example, the shutter signal is a rolling shutter signal such that each row, column, or group of pixels is sequentially enabled during consecutive acquisition windows. Control circuitry 120 may include selection circuitry (e.g., multiplexers), etc. to control the readout the image data one row at a time or may readout the image data using a variety of other techniques, such as a serial readout or a full parallel readout of all pixels simultaneously.

Figure 2:
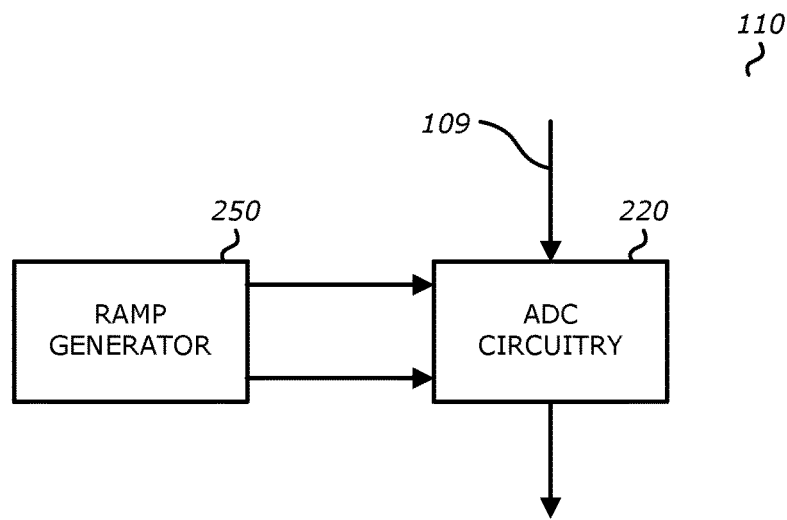
FIG. 2 is a block diagram illustrating the details of readout circuitry and logic circuitry of imaging system in FIG. 1 for reducing noise using a parallel multi-ramps merged comparator ADC in accordance to one embodiment of the invention.

FIG. 2 is a block diagram illustrating the details of readout circuitry of imaging system in FIG. 1 for reducing noise using a parallel multi-ramps merged comparator ADC in accordance to one embodiment of the invention. As shown in FIG. 2, the readout circuitry 110 may include amplification circuitry (not shown), an ADC circuitry 220 and ramp generator 250. ADC circuitry 220 may receive the pixel signal from pixel array 105 via bit lines 109. As further shown in FIG. 2, readout circuitry 110 includes a ramp generator 250 that generates a first ramp signal (e.g., Vramp1) and a second ramp signal (e.g., Vramp2) that are transmitted to ADC circuitry 220. In one embodiment, ramp generator 250 generates a plurality of ramp signals that are transmitted to ADC circuitry 220. In other embodiments, readout circuitry 110 may include a plurality of ramp generators to generate the first and second ramp signals (e.g., Vramp1, Vramp2), respectively. In some embodiments, logic circuitry 108 may include an ADC clock generator (not shown) that generates an ADC clock signal. In one embodiment, ADC clock generator is a phased locked loop (PLL). In this embodiment, ramp generator 250 receives the ADC clock signal and generates ramp signals that are synchronized to the ADC clock signal.

Figure 3:
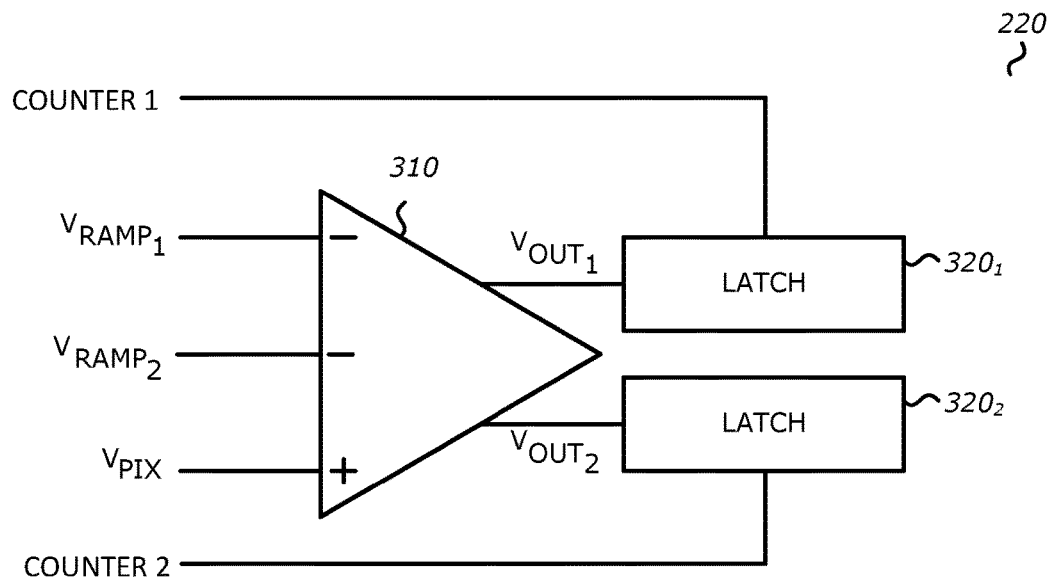
FIG. 3 is a block diagram illustrating the details of ADC circuitry in FIG. 2 in accordance to one embodiment of the invention.

FIG. 3 is a block diagram illustrating the details of ADC circuitry 220 in FIG. 2 in accordance to one embodiment of the invention. While not illustrated, in some embodiments, ADC circuitry 220 may include a plurality of ADC circuits. ADC circuits may be a type of column ADC (e.g., SAR, cyclic, etc.). ADC circuits may be similar for each column of pixel array 105. In one example, an entire column of pixel array 105 may share one readout circuit. In other examples, a group of pixels from pixel array 105, such a plurality of pixels arranged in the same column, or a plurality of pixels arranged in a group or cluster spanning more than one row or column of pixel array 105 may share one readout circuit.

ADC circuitry 220 converts the pixel data signals from analog to digital to obtain ADC outputs. As shown in FIG. 3, one example of an ADC circuit in ADC circuitry 220 includes a comparator 310 and a first latch or register $320_1$ and a second latch or register $320_2$.

Comparator 310 is a single comparator with multi-input first stage. Comparator 310 may be a fully differential op amp. In FIG. 3, comparator 310 receives one of the pixel data signals (e.g., Vpix) from pixel array 105 and the first and second ramp signals (e.g., Vramp1, Vramp2) from ramp generator 250. Comparator 310 compares the one of the pixel data signals (e.g., Vpix) to the ramp signals (e.g., Vramp1, Vramp2) and generates a first comparator output signal (e.g., Vout1) and a second comparator output signal (e.g., Vout2). When pixel data signal, Vpix, equals ramp signal Vramp1, first comparator output signal Vout1 is generated. Vout1 is sent to latch $320_1$ which latches the value of counter 1 at that particular time. Similarly, when pixel data signal, Vpix, equals ramp signal Vramp2, second comparator output signal Vout2 is generated. Vout2 is sent to latch $320_2$ which latches the value of counter 2 at that particular time. The digital value saved in latch $320_1$ and $320_2$ are the digital representation of the analog pixel data signal Vpix using the two ramp signals Vramp1 and Vramp2. In one example, counter 1 and counter 2 may increment at different rates. In another example, first latch $320_1$ latches to a counter to count based on the first comparator output signal (e.g., Vout1) received from comparator 310 to generate the first ADC output and second latch $320_2$ latches to a counter to count based on the second comparator output signal (e.g., Vout2) received from comparator 310 to generate the second ADC output.

In one embodiment, counter 1 and counter 2 of FIG. 3 may be asynchronous counters, arithmetic counters, etc. ADC outputs (e.g., Vout1, Vout2) from comparator 310 may be readout to function logic 115. In one embodiment, function logic 115 receives and processes first and second ADC outputs to generate a final ADC output.

In some embodiments, each ADC circuit may include a comparator 310 that includes more than two inputs to receive more than two ramp signals in addition to the one of the pixel data signals and outputs more than two comparator output signals. In this embodiment, each ADC circuit includes more than two latches (e.g., $320_1$-$320_n$, where n>2)

to respectively latch the counter based on the more than two comparator output signals (e.g., Vout1, Vout2).

FIG. 4A is a graph illustrating comparator output signals (e.g., Vout1, Vout2), one of the pixel data signals (e.g., Vpix), and ramp signals (e.g., Vramp1, Vramp2) (y-axis) in relation to the time (x-axis) in accordance to one embodiment of the invention. In FIG. 4A, first and second ramp signals (e.g., Vramp1, Vramp2) are different valued input ramps. In FIG. 4A, first and second ramp signals (e.g., Vramp1, Vramp2) have a voltage offset. In other words, the starting value of Vramp1 and Vramp2 are different, in the illustrated example, Vramp1 has a maximum voltage of $V_A$, while Vramp2 has a maximum voltage of $V_B$, the rate of change (or slope) of ramp signals Vramp1 and Vramp2 are the same but their starting values are different. Using this different offsets, CMS may be emulated in ADC circuitry 220 using single comparator 310. By using single comparator 310 in each ADC circuit in ADC circuitry 220 to compare one of the pixel data signals to two or more ramp signals, this embodiment reduces noise by emulating CMS while requiring less power and less area. Also shown in the graph of FIG. 4A is a first and second conversion time (e.g., tconv1, tconv2), which are the times required by comparator 310 to compare one of the pixel data signals (e.g., Vpix) to first and second ramp signal (e.g., Vramp1, Vramp2) and to generate first and second comparator output signal (e.g., Vout1, Vout2). Given the two different ramp signals (e.g., Vramp1, Vramp2) that act as different voltage offsets, the first and second comparator output signal (e.g., Vout1, Vout2) are shifted in FIG. 4A. After CDS, the first and second comparator output signal (e.g., Vout1, Vout2) have the same value if there is no noise perturbation. Thus, the noise may be averaged from the two comparator output signals. Generally, the correlated multi sampling (CMS) voltage $V_{CMS}$ is calculated as:

$$V_{CMS} = \frac{1}{M}\left(\sum_{i=1}^{M} V_{SHR}(i) - \sum_{i=1}^{M} V_{SHS}(i)\right)$$

In this equation, M is the number of samples. In one embodiment, the first and second comparator output signals (e.g., Vout1, Vout2) from comparator 310 in each ADC circuit are used in lieu of samples $V_{SHR}$ and $V_{SHS}$ to emulate of CMS.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4B:
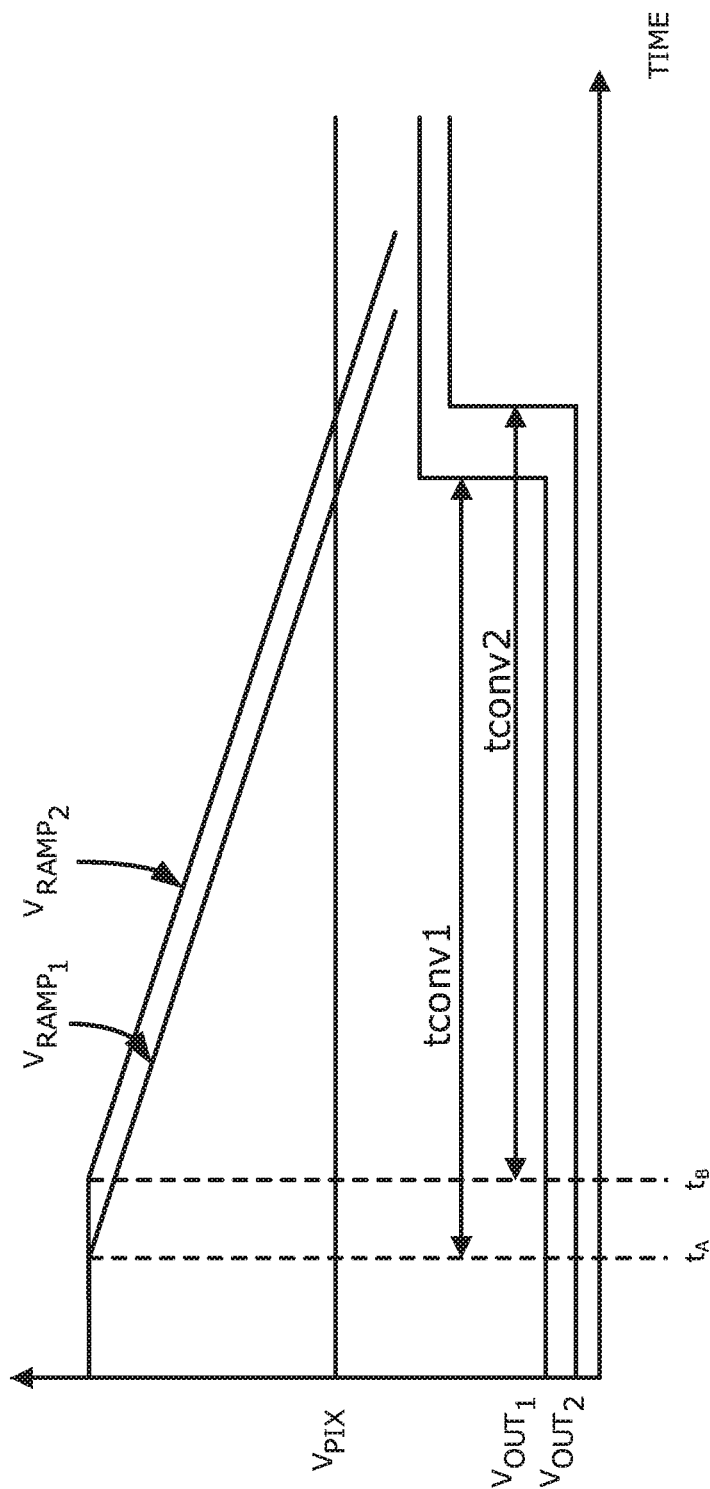
FIG. 4B is a graph illustrating comparator output signals, one of the pixel data signals, and ramp signals (y-axis) in relation to the time (x-axis) in accordance to another embodiment of the invention.

FIG. 4B is a graph illustrating comparator output signals (e.g., Vout1, Vout2), one of the pixel data signals (e.g., Vpix), and ramp signals (e.g., Vramp1, Vramp2) (y-axis) in relation to the time (x-axis) in accordance to another embodiment of the invention. In FIG. 4B, first and second ramp signals (e.g., Vramp1, Vramp2) have a timing offset. In other words, the time at which the slope of Vramp1 and Vramp2 start changing are different, in the illustrated example, the slope of Vramp1 does not start changing until time $t_A$, while the slope of Vramp2 does not start changing until time $t_B$, the rate of change (or slope) of ramp signals Vramp1 and Vramp2 are the same but their starting times are different. Using this different offsets, CMS may be emulated in ADC circuitry 220 using single comparator 310. By using single comparator 310 in each ADC circuit in ADC circuitry 220 to compare one of the pixel data signals to two or more ramp signals, this embodiment reduces noise by emulating CMS while requiring less power and less area. Also shown in the graph of FIG. 4B is a first and second conversion time (e.g., tconv1, tconv2), which are the times required by comparator 310 to compare one of the pixel data signals (e.g., Vpix) to first and second ramp signal (e.g., Vramp1, Vramp2) and to generate first and second comparator output signal (e.g., Vout1, Vout2). Given the two different ramp signals (e.g., Vramp1, Vramp2) that act as different voltage offsets, the first and second comparator output signal (e.g., Vout1, Vout2) are shifted in FIG. 4B.

Figure 5:
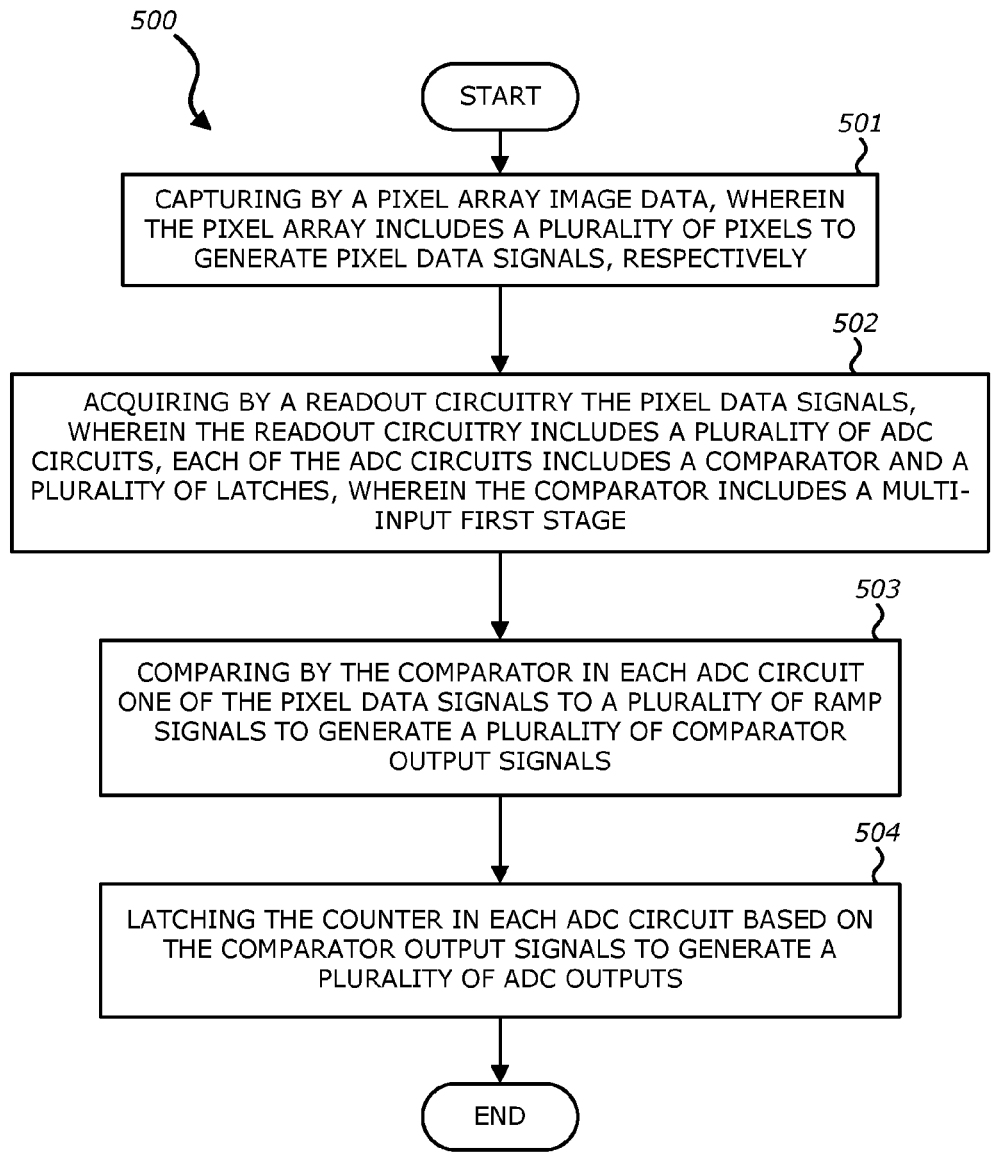
FIG. 5 is a flowchart illustrating a method of for reducing noise in an image sensor using a parallel multi-ramps merged comparator ADC in accordance to one embodiment of the invention.

FIG. 5 is a flowchart illustrating a method of for reducing noise in an image sensor using a parallel multi-ramps merged comparator ADC in accordance with one embodiment of the invention. Method 500 starts with a pixel array 105 capturing image data at Block 501. Pixel array 105 includes a plurality of pixels to generate pixel data signals, respectively. At Block 502, a readout circuitry 110 acquires the pixel data signals. Readout circuitry 110 may include ADC circuitry 220 and ramp generator 250. ADC circuitry 220 may include a plurality of ADC circuits. Each ADC circuits include a comparator 310 and a plurality of latches (e.g., latches $320_1$, $320_2$). Comparator 310 includes a multi-input first stage. At Block 503, comparator 310 included in each ADC circuit compares one of the pixel data signals to a plurality of ramp signals to generate a plurality of comparator output signals. The ramp signals may be have a timing offset or voltage offset. In one embodiment, comparator 310 in each ADC circuits is a two-parallel inputs merged comparator for multi-sampling that includes a plurality of CMOS transistors. At Block 504, latches (e.g., latches $320_1$, $320_2$) the counter based on the comparator output signals, respectively, to generate a plurality of ADC outputs. The counters may include an arithmetic counter or an asynchronous counter. In one embodiment, a function logic 115 generates a final ADC output based on the ADC outputs generated by latches in each ADC circuit of ADC circuitry 220.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising:
   a pixel array for acquiring image data of a frame, wherein the pixel array includes a plurality of pixels to generate pixel data signals, respectively;
   readout circuitry coupled to the pixel array, wherein the readout circuitry includes:
     analog-to-digital conversion (ADC) circuitry that converts the pixel data signals from analog to digital to obtain ADC outputs, wherein the ADC circuitry includes a plurality of ADC circuits, wherein each of the plurality of ADC circuits includes:
       a single comparator that includes a multi-input first stage, the single comparator compares one of the pixel data signals to a first ramp signal and a second ramp signal, wherein a portion of the second ramp signal having a non-zero slope is parallel and offset from the first ramp signal, wherein the single comparator concurrently outputs a first comparator output signal based on the comparison of the pixel data signal to the first ramp signal and a second comparator output signal based on the comparison of the pixel data signal to the second ramp signal; and
       a first latch latches to a first counter to count based on the first comparator output signal and to generate a first ADC output, and a second latch latches to a second counter to count based on the second comparator output signal from the single comparator to generate a second ADC output; and
   logic circuitry to control the readout circuitry, the logic circuitry including a ramp generator to generate the first and second ramp signals.

2. The image sensor of claim 1, wherein the first and second ramp signals are offset by a timing offset.

3. The image sensor of claim 1, wherein the first and second ramp signals are offset by a voltage offset.

4. The image sensor of claim 1, wherein the first and second counters include an arithmetic counter or an asynchronous counter.

5. The image sensor of claim 1, wherein the single comparator in each ADC circuit is a two-parallel inputs merged comparator for multi-sampling that includes a plurality of transistors.

6. The image sensor of claim 1, further comprising:
   a function logic circuit to generate a final ADC output based on the first and second ADC outputs, wherein the function logic circuit generates the final ADC output based on an average of the first and second ADC outputs.

7. The image sensor of claim 1, wherein the single comparator is coupled to receive the pixel data signal on a first input, the first ramp signal on a second input, and the second ramp signal on a third input, and wherein the first and second ramp signals are received concurrently.

8. The image sensor of claim 1, wherein the first comparator output signal and the second comparator output signal are utilized to emulate correlated multi-sampling by averaging noise of the image sensor.

9. The image sensor of claim 1, wherein the single comparator includes a fully differential operational amplifier.

10. The image sensor of claim 1, wherein the portion of the second ramp signal having the non-zero slope that is parallel and offset from the first ramp signal is a continuous ramp signal.

11. An image sensor comprising:
    a pixel array for acquiring image data of a frame, wherein the pixel array includes a plurality of pixels to generate pixel data signals, respectively;
    readout circuitry coupled to the pixel array, wherein the readout circuitry includes:
      analog-to-digital conversion (ADC) circuitry that converts the pixel data signals from analog to digital to obtain ADC outputs, wherein the ADC circuitry includes a plurality of ADC circuits, and wherein each of the plurality of ADC circuits includes:
        a single comparator that includes a multi-input first stage, the single comparator compares one of the pixel data signals to a plurality of ramp signals, wherein each of the plurality of ramp signals are different, wherein the single comparator concurrently outputs a plurality of comparator output signals, wherein each of the plurality of comparator output signals is based on a comparison of a respective one of the plurality of ramp signals to the same pixel data signal; and
        a plurality of latches which latch to a plurality of counters to count based on the plurality of comparator output signals, respectively, to generate a plurality of ADC outputs, respectively; and
    logic circuitry to control the readout circuitry, the logic circuitry including a plurality of ramp generators to generate the plurality of ramp signals.

12. The image sensor of claim 11, wherein the plurality of ramp signals are offset from one another by a timing offset.

13. The image sensor of claim 11, wherein the plurality of ramp signals are offset from one another by a voltage offset.

14. The image sensor of claim 11, wherein the plurality of counters include an arithmetic counter or an asynchronous counter.

15. The image sensor of claim 11, wherein the single comparator in each ADC circuit is a two-parallel inputs merged comparator for multi-sampling that includes a plurality of transistors.

16. The image sensor of claim 11, further comprising:
    a function logic circuit to generate a final ADC output based on the plurality of ADC outputs, wherein the function logic circuit generates the final ADC output based on an average of the plurality of ADC outputs.

17. A method of reducing noise in an image sensor using a parallel multi-ramps merged comparator analog-to-digital converter (ADC), the method comprising:
    capturing by a pixel array image data, wherein the pixel array includes a plurality of pixels to generate pixel data signals, respectively;
    acquiring, by ADC circuitry, the pixel data signals, wherein the ADC circuitry includes a plurality of ADC circuits, each of the ADC circuits including a single comparator and a plurality of latches, wherein the single comparator includes a multi-input first stage;
    concurrently and separately comparing, by the single comparator in each ADC circuit, one of the pixel data signals to each of a plurality of ramp signals, the plurality of ramp signals received from logic circuitry, to generate a plurality of comparator output signals based on the comparison of the data signal to a respective one of the plurality of ramp signals, wherein portions of the plurality of ramp signals having non-zero slopes are parallel and off-set from one another; and latching a counter in each ADC circuit based on the comparator output signals, respectively, to generate a plurality of ADC outputs.

18. The method of claim 17, wherein the plurality of ramp signals are offset from one another by a timing offset.

19. The method of claim 17, wherein the plurality of ramp signals are offset from one another by a voltage offset.

20. The method of claim 17, further comprising: generating a final ADC output by a function logic circuit based on the plurality of ADC outputs, wherein the function logic circuit generates the final ADC output based on an average of the plurality of ADC outputs.

21. The method of claim 17, wherein the counter includes an arithmetic counter or an asynchronous counter.

22. The method of claim 17, wherein the single comparator in each of the ADC circuits is a two-parallel inputs merged comparator for multi-sampling that includes a plurality of transistors.

* * * * *